(12) United States Patent
Gu et al.

(10) Patent No.: US 9,126,133 B2
(45) Date of Patent: Sep. 8, 2015

(54) DUST REMOVAL METHOD USING BAGHOUSE FILTERS AND DUST REMOVAL APPARATUS THEREFOR

(75) Inventors: Minghai Gu, Shanghai (CN); Songliang Sun, Shanghai (CN); Guangliang Luo, Shanghai (CN)

(73) Assignee: Synthesis Energy Systems, Inc., Houston, TX (US)

( * ) Notice: Subject to any disclaimer, the term of this patent is extended or adjusted under 35 U.S.C. 154(b) by 806 days.

(21) Appl. No.: 12/994,850

(22) PCT Filed: May 26, 2009

(86) PCT No.: PCT/CN2009/000578
§ 371 (c)(1),
(2), (4) Date: Jun. 3, 2011

(87) PCT Pub. No.: WO2009/143699
PCT Pub. Date: Dec. 3, 2009

(65) Prior Publication Data
US 2011/0265652 A1   Nov. 3, 2011

(30) Foreign Application Priority Data

May 27, 2008  (CN) .......................... 2008 1 0109533

(51) Int. Cl.
*B01D 46/00* (2006.01)
*B01D 46/02* (2006.01)
*B01D 46/44* (2006.01)
*C10L 3/00* (2006.01)

(52) U.S. Cl.
CPC .............. *B01D 46/02* (2013.01); *B01D 46/446* (2013.01); *B01D 46/448* (2013.01); *C10L 3/00* (2013.01)

(58) Field of Classification Search
CPC ................ B01D 46/24–46/2474; B01D 46/02; B01D 46/04; A47L 9/14–9/149; C10L 3/00
USPC ......... 95/273–283; 96/424–429; 55/282–305, 55/341.1–341.7, 361–382
See application file for complete search history.

(56) References Cited

U.S. PATENT DOCUMENTS

| 4,398,931 | A | * | 8/1983 | Shevlin ........................ 55/341.1 |
| 4,407,672 | A | * | 10/1983 | Deuschle et al. ............ 75/10.63 |
| 4,764,190 | A | * | 8/1988 | Israelson et al. ............. 55/282.1 |
| 4,898,601 | A | * | 2/1990 | Casey .......................... 55/341.1 |

(Continued)

FOREIGN PATENT DOCUMENTS

EP    551951 A1 * 7/1993

*Primary Examiner* — Thomas McKenzie
(74) *Attorney, Agent, or Firm* — Kening Li; Miller Canfield

(57) ABSTRACT

A dust removal method using baghouse filter to process raw syngas from fluidized bed coal gasifier, wherein temperature in the baghouse (300) is maintained at 180° C.~250° C., pressure difference between the gas inlet (130) of the baghouse (300) and the gas outlet (110) of the baghouse (300) is controlled at 1000-5000Pa, the raw syngas from the fluidized bed coal gasifier enters the gas inlet under the pressure of 0.2-3.0Mpa. The present method effectively solves the technical problems of condensation and baghouse block due to high steam and ash content in the raw syngas from the fluidized bed coal gasifier and the present method is also applicable to remove dusts from the raw syngas produced by the fluidized bed coal gasifier under the conditions of high water-gas ratio (the water-gas ratio is up to 37%), high dust content (15-100g/Nm3 dusts) and 0.2-3.0Mpa pressure. The present invention also discloses a baghouse dust collector and a dense phase pneumatic conveying apparatus for the method.

14 Claims, 4 Drawing Sheets

(56) References Cited

U.S. PATENT DOCUMENTS 4,960,448 A * 10/1990 Zievers ............................ 55/523
5,062,872 A * 11/1991 Williams ......................... 55/302
5,711,785 A * 1/1998 Maxwell ........................... 95/20
2005/0022981 A1* 2/2005 Helleur .......................... 165/108
2008/0000155 A1* 1/2008 Van Den Berg et al. ......... 48/208

* cited by examiner

DUST REMOVAL METHOD USING BAGHOUSE FILTERS AND DUST REMOVAL APPARATUS THEREFOR

FIELD OF THE INVENTION

The present invention relates to a dust removal method using baghouse filter, in particular, relates to a dust removal method using baghouse filter to process raw syngas from fluidized bed coal gasifier, a baghouse dust collector and a dense phase pneumatic conveying apparatus.

BACKGROUND OF THE INVENTION

The raw syngas (raw gas) from the fluidized bed coal gasifier must go through cooling and dust removal processes before desulfurizing and decarburizing processes in the next stage in order to obtain qualified syngas (clean gas). Wet dust removal method is commonly used in the prior art, but will seriously result in secondary pollution and water treatment problems. For example, after the deposition of primary black water generated by water-washing method, secondary black water needs further biochemical treatment. Equipments and processes for the biochemical treatment of the black water from wash water are quite costly. Plate heat exchanger used in the water-washing method is also very easily blocked by wet mud, which will result in shutdown during the production, so the plate heat exchange has to be frequently disassembled and washed by chemical agents. Meanwhile, the carbon mud will contain high content of water after the deposition of the black water, and the wet carbon mud cannot be recycled in the industry and treated as three wastes. Accordingly, there is an urgent need to provide an innovative and improved dust removal technology to process the raw syngas from the fluidized bed coal gasifier.

A dust removal system using baghouse filter for blast furnace gas is disclosed in a Chinese utility model patent with Publication No. CN2828056 to remove dusts from blast furnace gas. A big dry-type dust remover using baghouse filter for blast furnace gas is also disclosed in a Chinese utility model with Publication No. CN201008774 to remove dusts from blast furnace gas. The blast furnace gas is different from the raw syngas produced by the fluidized bed coal gasifier, for example, the blast furnace gas contains no steam and far less dusts (the blast furnace gas contains about 20 g/m$^3$ dusts, one fifth of the dust content in the raw syngas from the fluidized coal gasifier), while the raw syngas from the fluidized coal gasifier has high steam content (water-gas ratio is up to 37%, volume concentration, the same hereinafter), so the dust removal method using baghouse filter in the prior art cannot effectively remove dusts from the syngas produced by the fluidized coal gasifier. Due to the condensation of steam and high dust content in the raw syngas from the fluidized bed, the baghouse filter will be blocked during the dust removal process so as to reduce the dust removal efficiency.

In addition, dust recycle after the dust removal is another common technical problem for the raw syngas from the fluidized bed coal gasifier in the prior art. An embedded scraper mechanical transport method is commonly used to recycle the dusts, but this technology works under normal pressure while the dusts are removed from the raw syngas produced by the fluidized bed gasifier under certain pressure. Therefore, the embedded scraper mechanical transport method is not applicable in this case. It is also difficult to use the water spraying dust removal method to solve the above problem because the coal ashes collected from the raw syngas produced by the fluidized bed gasifier have high carbon content and hydrophobicity.

Currently, pneumatic conveying apparatus is also widely used in the transportation of dry powder (such as flour, sugar powder). However, the fine coal ashes (10 microns) collected from the raw syngas produced by the fluidized bed gasifier after the dust removal have high steam content and tend to be mushy, so those skilled in the art usually consider the pneumatic conveying apparatus not applicable to deliver the coal ashes collected from the raw syngas produced by the fluidized bed gasifier after the dust removal.

Further, star-shaped feeding valve is requisite in the dilute phase pneumatic conveying apparatus. This kind of star-shaped feeding valve cannot endure high pressure, which will easily result in gas leakage or ash ejection.

SUMMARY OF THE INVENTION

Aiming at the problem of baghouse filter block due to the high content of steam and ashes in the raw syngas from the fluidized bed coal gasifier, the first technical problem to be solved by the present invention is to provide a dust removal method using baghouse filter to process raw syngas from fluidized bed coal gasifier, which is used for cleaning and removing dust in the raw syngas from the fluidized bed coal gasifier.

The second technical problem to be solved by the present invention is to provide a baghouse dust collector for the above method.

In a dust removal method using baghouse filter to process raw syngas from the fluidized bed coal gasifier according to one aspect of the present invention, the raw syngas with high water-gas ratio of 37% (volume concentration, the same hereinafter) from the fluidized bed coal gasifier enters a baghouse from a gas inlet of a baghouse dust collector, flows through fibre spaces of the baghouse, and enters a clean gas pipe from a gas outlet of the baghouse dust collector; ashes are blocked and absorbed by outer surface of the baghouse and released from an ash outlet on the lower portion of the baghouse dust collector.

In the above-mentioned method, temperature in the baghouse is maintained at 180° C. ~250° C. Pressure difference between the gas inlet of the baghouse and the gas outlet of the baghouse is controlled at 1000-5000 Pa.

In the above-mentioned method, the raw syngas from the fluidized bed coal gasifier enters the gas inlet under the pressure of 0.2-3.0 Mpa.

The present invention effectively solves the technical problems of condensation and baghouse block due to high steam and ash content in the raw syngas from the fluidized bed coal gasifier by controlling the temperature in the baghouse at 180° C.-250° C. and the pressure difference between the gas inlet of the baghouse and the gas outlet of the baghouse at 1000-5000 Pa; and the dust removal method using baghouse filter of the present invention is also applicable to remove dusts from the raw syngas produced by the fluidized bed coal gasifier under the conditions of high water-gas ratio (the water-gas ratio is up to 37%), high dust content (15-100 g/Nm$^3$ dusts) and 0.2-3.0 Mpa pressure.

The dry coal ashes produced by the method of the present invention can be directly used in the cement manufacturing and other industries, which has value in use. The present invention can reduce secondary pollution caused by black water generated by wet method and produce clean syngas (with dust content of 10 mg/Nm$^3$) with high dust recovery rate of 99.5%.

The present invention starts a new era in the coal gasification and coal liquefaction industries. The present invention not only achieves safe and consecutive manufacture in the industry, but also saves energy of 50% compared to the wet method.

A baghouse dust collector according to another aspect of the present invention comprises:

a baghouse dust collector case body;

a baghouse in the case body;

a gas outlet on the upper potion of the baghouse dust collector case body and in communication with the baghouse, a gas outlet valve is arranged on the gas outlet;

a gas inlet on the lower potion of the baghouse dust collector case body and in communication with the bagouse dust collector case body and the outer surface of the baghouse, a gas inlet valve is arranged on the gas inlet;

a back flush inlet on the upper portion of the baghouse dust collector case body and in communication with the bagouse dust collector case body and the outer surface of the baghouse, a back flush gas source is connected with the back flush inlet, a back flush valve is arranged on the back flush inlet; by opening the back flush valve, back flush gas, e.g. nitrogen, with certain pressure and quantity is blown to the baghouse dust collector case body to wash the absorption layer on the outer surface of the baghouse rapidly and blow the ashes on the absorption layer into an ash hopper;

an ash outlet at the bottom of the baghouse dust collector and in communication with the baghouse dust collector case body and the outer surface of the baghouse;

an ash hopper in communication with the ash outlet;

the raw syngas from the fluidized bed coal gasifier is introduced into the gas inlet, the gas outlet is connected with a clean gas pipe; an insulating layer is arranged on the outer wall of the baghouse dust collector case body to keep the temperature in the baghouse at 180° C.-250° C.

The insulating layer is an electricity-heated insulating layer or a steam-heated insulating layer. The electricity-heated insulating layer comprises an electric heating tube wound around the outer wall of the baghouse dust collector case body, and the electric heating tube is in electric connection with an electric controller. The steam-heated insulating layer comprises a steam tube wound around the outer wall of the baghouse dust collector case body, and the steam tube is connected with a general steam valve.

The electric heating tube or the steam tube is spirally wound around the outer wall of the baghouse dust collector case body in circumference direction or arranged along the outer wall of the baghouse dust collector case body in axial direction.

Overheated steam at 200° C.~300° C. is introduced into the steam tube.

The back flush valve is a controllable pulse valve. The back flush valve can wash the dust filtration side to remove the dusts from the surface of the baghouse and recover the dust removal ability of the baghouse dust collector when needed or filtration resistance caused by the dust deposition on the dust filtration side (indicated by the pressure difference between the gas inlet and the gas outlet of the baghouse dust collector) increases to 1000~5000 Pa after the baghouse filter works for a period of time.

A temperature sensor is arranged in the baghouse dust collector case body, and the temperature sensor is in signal connection with a controller.

The present invention also comprises a dense phase pneumatic conveying apparatus connected with the ash hopper to deliver the collected ashes after dust removal by a dense phase pneumatic conveying method.

The dense phase pneumatic conveying apparatus according to the present invention delivers the ashes safely and consecutively out of the system under certain pressure (0.2-3.0 Mpa). The dense phase pneumatic conveying apparatus can reduce the number of used valves and need no star-shaped feeding valve, which can improve gas tightness of the whole dense phase pneumatic conveying apparatus.

BRIEF DESCRIPTION OF THE DRAWINGS

Embodiments according to the present invention will be further described in conjunction with accompanying figures as follows.

DETAILED DESCRIPTION OF THE PREFERRED EMBODIMENT

An embodiment according to the present invention is provided in conjunction with accompanying figures.

Figure 1:
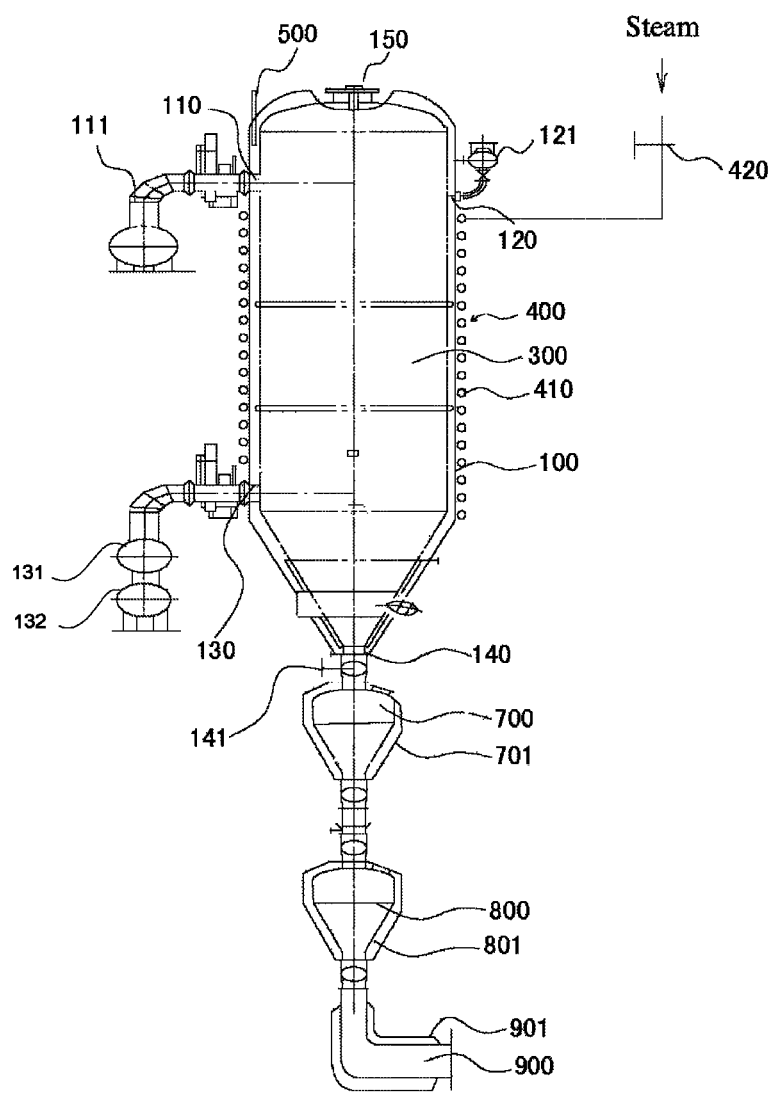
FIG. 1 shows the structure of the baghouse dust collector according to the present invention.

As shown in FIG. 1, a baghouse dust collector according to the present invention comprises a baghouse dust collector case body 100 and a baghouse 300 in the baghouse dust collector case body 100. The baghouse 300 is installed in the baghouse dust collector case body 100 through a baghouse frame and a lattice board to remove dusts from the raw syngas produced by the fluidized bed coal gasifier. The baghouse 300 uses FMS 9806 filter bag with unit weight of 800 g/m².

A gas outlet 110 and a back flush inlet 120 are arranged on the upper portion of the baghouse dust collector case body 100, a gas inlet 130 is arranged on the lower portion of the baghouse dust collector case body 100, an ash outlet 140 is arranged at the bottom of the baghouse dust collector case body 100, and an explosion relief valve 150 is arranged on the top of the baghouse dust collector case body 100 to release pressure automatically when the pressure exceeds a predetermined pressure.

The gas outlet 110 is in communication with the baghouse 300 and a gas outlet valve 111 is arranged on the gas outlet 110. The back flush inlet 120, the gas inlet 130 and the ash outlet 140 are in communication with the baghouse dust collector case body 100 and the outer surface of the baghouse 300, and a gas inlet valve 131 is arranged on the gas inlet 130.

A back flush valve 121 is arranged on the back flush inlet 120. The back flush valve 121 is a submerged pulse valve to back flush by low pressure pulse, and the back flush pressure is 0.35-0.4 MPa. Back flush gas, e.g. nitrogen, is introduced into the back flush valve 121. The back flush valve 121 can wash the dust filtration side to remove the dusts from the surface of the baghouse 300 and recover the dust removal ability of the baghouse dust collector when needed or especially when filtration resistance caused by the dust deposition on the dust filtration side (indicated by the pressure difference between the gas inlet and the gas outlet of the baghouse dust collector) increases to 1000~5000 Pa after the baghouse filter works for a period of time.

The gas outlet valve 111 is a blind plate valve and the gas inlet valve 131 is a pneumatic butterfly valve for remote operation. Closing the gas outlet valve 111 and gas inlet valve 131 at the same time and separating the baghouse dust collector case body 100 from the system to ensure the safety of repairmen when the baghouse dust collector case body 100 is repaired.

The baghouse dust collector according to the present invention can be used separately or with other baghouse dust collectors in parallel. If the baghouse dust collector is used separately, the gas inlet valve 131 is connected with a general raw gas pipe (not shown in the figures) via a manual ball valve (not shown in the figures) and the gas outlet valve 111 is connected with a general clean gas pipe (not shown in the figures) via a manual ball valve (not shown in the figures). If the baghouse dust collector is used with other baghouse dust collectors in parallel, the gas inlet valve 131 is connected with a branch raw gas pipe (not shown in the figures) via a manual ball valve, the branch raw gas pipe (not shown in the figures) is connected with a general raw gas pipe; the gas outlet valve 111 is connected with a branch clean gas pipe (not shown in the figures) via a manual ball valve, the branch clean gas pipe (not shown in the figures) is connected with a general clean gas pipe; the ends of the general raw gas pipe and the general clean gas pipe are connected with a manual ball valve (not shown in the figures) and a discharge pipe to release gas timely when the apparatus is repaired and gas is changed.

Figure 3:
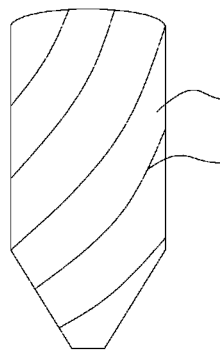
FIG. 3 shows one arrangement of the steam tube in the baghouse dust collector according to the present invention.
Figure 4:
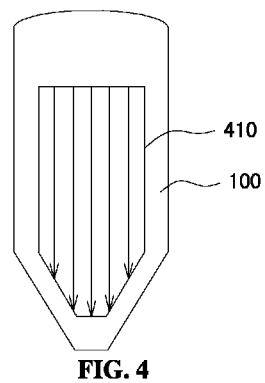
FIG. 4 shows another arrangement of the steam tube in the baghouse dust collector according to the present invention.

An insulating layer is arranged on the outer wall of the baghouse dust collector case body 100 to keep the temperature in the baghouse 300 at 180° C.~250° C. In this embodiment, the insulating layer is a steam-heated insulating layer 400. Also, an electricity-heated insulating layer can be used instead. The steam-heated insulating layer 400 comprises a steam tube 410 wound around the outer wall of the baghouse dust collector case body 100 in two ways: one way is shown in FIG. 3, wherein the steam tube is spirally wound around the outer wall of the baghouse dust collector case body 100 in circumference direction; the other way is shown in FIG. 4, wherein the steam tube is arranged along the outer wall of the baghouse dust collector case body 100 in axial direction. If the electricity-heated insulating layer is used instead, the electricity-heated insulating layer comprises an electric heating tube wound around the outer wall of the baghouse dust collector case body 100 and the electric heating tube is in electric connection with an electric controller. The electric heating tube is wound around the outer wall of the baghouse dust collector case body 100 in the same ways as the steam tube 410.

The steam tube 410 is connected with a general steam valve 420 and overheated steam at 200° C.~400° C. is introduced into the general steam valve 420 to keep the temperature in the baghouse 300 at 180° C.~250° C. In order to control the temperature in the baghouse 300 at 180° C. ~250° C., a temperature sensor 500 is arranged in the baghouse dust collector case body 100 according to this embodiment, and the temperature sensor 500 is a thermocouple to convert the detected temperature value into electric signal. A controller 600 is used to control open degree of the general steam valve 420 so as to control the temperature in the baghouse 300. The controller 600 is a Siemens S7-800 programmable logic controller.

Figure 2:
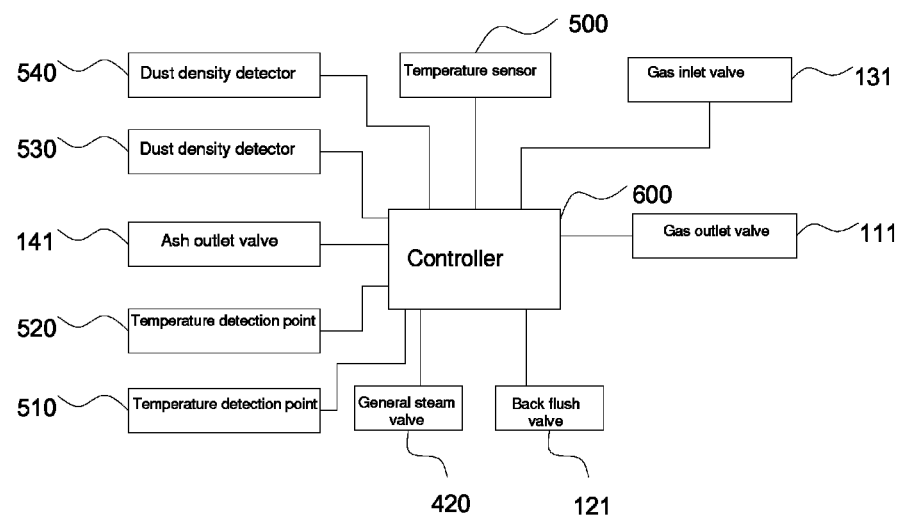
FIG. 2 shows the controlling system principle of the baghouse dust collector according to the present invention.

In addition, a temperature detection point 510 is set on the outer wall of the baghouse dust collector case body 100 (as shown in FIG. 2) and a temperature detection point 520 is set on the general clean gas pipe. The temperature detection points 510, 520 are in signal connection with the controller 600.

A controllable ash outlet valve 141 is arranged on the ash outlet 140, the ash outlet valve 141 is connected with an ash hopper 700, and the ash outlet valve 141 is a pneumatic ball valve in connection with the controller 600.

The present invention can further comprise dust density detectors 530 and 540 respectively arranged on the general clean gas pipe and the branch clean gas pipe. The dust density detectors 530 and 540 are in signal connection with the controller 600 to detect the density of the clean gas.

The controller 600 is further in signal connection with the gas inlet valve 131, the gas outlet valve 111, the back flush valve 121 and the general steam valve 420 to control gas inlet valve 131, the gas outlet valve 111, the back flush valve 121 and the general steam valve 420.

The complete course of the dust removal by the baghouse dust collector will be described as follows: the raw syngas produced by the fluidized bed coal gasifier directly enters the baghouse dust collector case body 100 via the general raw gas pipe or the branch raw gas pipe, the manual ball valve 132, the gas inlet valve 131 and the gas inlet 230. Then, the raw syngas flows through fibre spaces of the baghouse 300 and enters the general clean gas pipe or the branch clean gas pipe via the gas outlet 110, the gas outlet valve 111 and the manual ball valve 112. The ashes are blocked by the baghouse 300 and absorbed on the outer surface of the baghouse 300, and some ashes fall into the ash outlet 140 at the bottom of the baghouse dust collector case body 100 after colliding with each other. In prior art, block of the baghouse 300 will be caused by resistance due to increasing thickness of absorption layer on the outer surface of the baghouse 300 as time goes by, as well as condensation of steam in high content, and high ash content in the raw syngas from the fluidized bed coal gasifier. According to present invention, the insulating layer is arranged outside the baghouse dust collector case body 100 to control the temperature in the baghouse 300 at 180° C.~250° C., which will not result in block of the baghouse 300.

When filtration efficiency falls below a predetermined value, the outer surface of the baghouse 300 is washed rapidly to blow the ashes on the absorption layer into the ash outlet 140 at the bottom of the baghouse dust collector case body 100 by turning off the gas inlet valve 131 and opening the back flush valve 121 to blow back flush gas, e.g. nitrogen, with certain pressure and quantity to the baghouse 300 via back flush inlet 120 so as to recover gas permeability, dust removal ability of the baghouse 300 and penetrability of the raw gas. Then, stopping cleaning dusts by turning off the back flush valve 121 and starting filtering gas for the next round. Some of the dust removal units are used for filtering gas, while the others are used for stopping filtering gas and reversely blowing the dust. Besides timing operation method, the dust cleaning process can be started according to resistance drop of the absorption layers inside and outside the baghouse 300. During the dust cleaning process, the resistance drop inside and outside the baghouse 300 increases with the rising amount of the dusts absorbed on the surface of the baghouse 300. When the resistance drop reaches a predetermined value, starting the dust cleaning process. The dust cleaning process can be performed by online and offline method.

The ashes can fall into the ash hopper 700 by opening the ash outlet valve 141. When the ashes in the ash hopper 700 reach a certain height, the ashes are discharged in the way of dense phase pneumatic transmission by a dense phase pneumatic conveying apparatus connected with the ash hopper 700.

Figure 5:
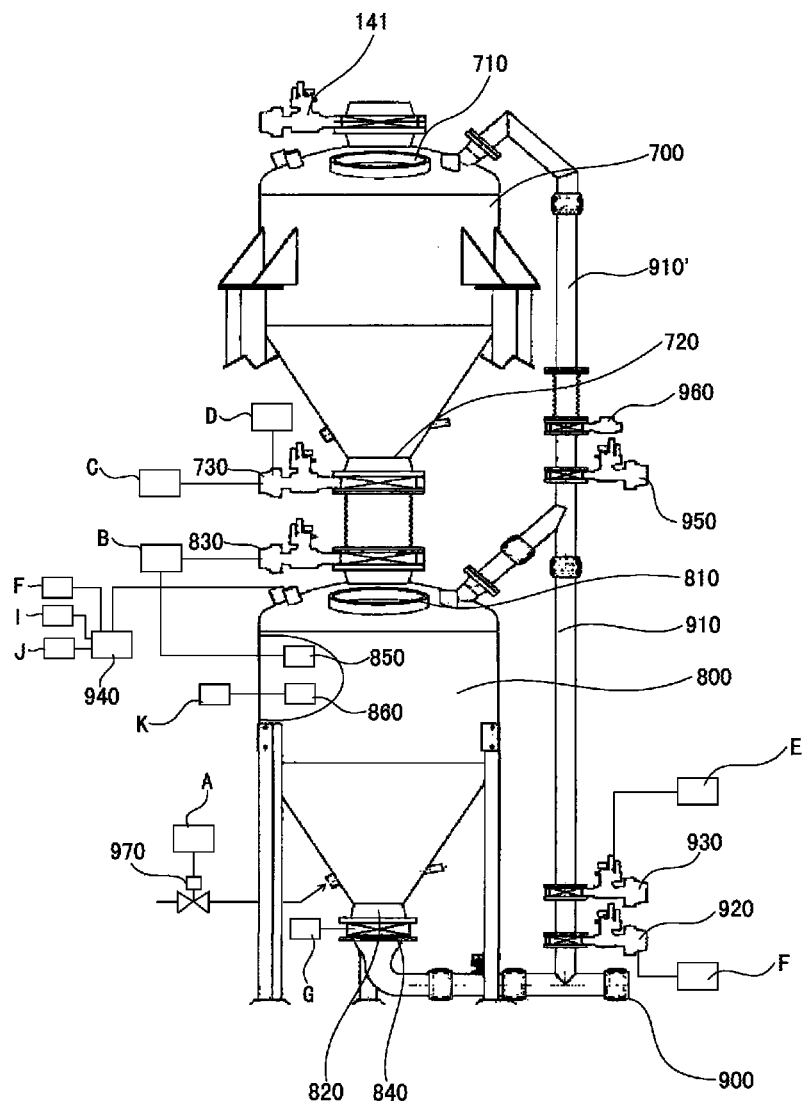
FIG. 5 shows the structure of the dense phase pneumatic conveying apparatus according to the present invention.

As shown in FIG. 4 and FIG. 5, the dense phase pneumatic conveying apparatus according to the present invention comprises an ash conveying vessel 800, an ash conveying pipe 900, pressure-equalizing pipes 910, 910', a first small hole exhaust valve 920, a pressure decrease timer F, a first solid exhaust valve 930, an over pressure release timer E, a second solid exhaust valve 950, a second small hole exhaust valve 960, an conveying vessel shutoff valve 730, an over load timer C, an inlet shutoff delay timer D, a conveying vessel inlet valve 830, a balance timer B, a conveying vessel level meter 850, a gas nozzle electromagnetic valve 940, a pressure release overtime timer H, a pressure increase timer I, an over conveying timer J, a pressure sensor 860, a pressure low timer K, an air nozzle electromagnetic valve 970, an aeration timer A, a conveying vessel outlet valve 840 and a valve positioning timer G.

The ash hopper 700 has a first ash inlet 710 on the top and a first ash outlet 720 at the bottom, and the first ash inlet 710 is in communication with the ash outlet valve 141 at the bottom of the baghouse dust collector case body 100.

The ash conveying vessel 800 has a second ash inlet 810 on the top and a second ash outlet 820 at the bottom, the first ash outlet 720 at the bottom of the ash hopper 700 is in communication with the second ash inlet 810 on the top of the ash conveying vessel 800 via the conveying vessel shutoff valve 730 and the conveying vessel inlet valve 830, the second ash outlet 820 at the bottom of the ash conveying vessel 800 is in communication with the ash conveying pipe 900 via the conveying vessel outlet valve 840. The ash conveying pipe 900 is in communication with the ash hopper 700 and the ash conveying vessel 800 via the pressure-equalizing pipes 910, 910'. The conveying vessel inlet valve 830 is connected with the balance timer B, the conveying vessel shutoff valve 730 is connected with the over load timer C and the inlet shutoff delay timer D, the conveying vessel outlet valve 840 is connected with the valve positioning timer G.

The first small hole exhaust valve 920 and the first solid exhaust valve 930 are arranged on the pressure-equalizing pipe 910 between the ash conveying pipe 900 and the ash conveying vessel 800, the first solid exhaust valve 930 is connected with the over pressure release timer E, and the first small hole exhaust valve 920 is connected with the pressure decrease timer F.

The second solid exhaust valve 950 and the second small hole exhaust valve 960 are arranged on the pressure-equalizing pipe 910' between the ash conveying vessel 800 and the ash hopper 700.

In addition, the gas nozzle electromagnetic valve 940 is arranged on the upper portion of the ash conveying vessel 800, and the air nozzle electromagnetic valve 970 is arranged on the lower potion of the ash conveying vessel 800. The gas nozzle electromagnetic valve 940 is connected with the pressure release overtime timer H, the pressure increase timer I and the over conveying timer J. The conveying vessel level meter 850 and the pressure sensor 860 are arranged in the ash conveying vessel 800, the conveying vessel level meter 850 is connected with the balance timer B, and the pressure sensor 860 is connected with the pressure low timer K.

Figure 6:
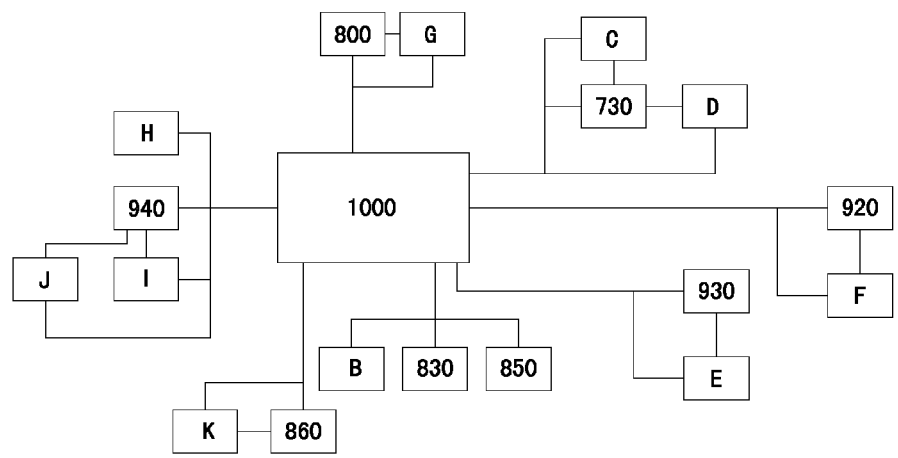
FIG. 6 shows the electronics principle of the dense phase pneumatic conveying apparatus according to the present invention.

As shown in FIG. 6, a controller 1000 is connected with the first small hole exhaust valve 920, the pressure decrease timer F, the first solid exhaust valve 930, the over pressure release timer E, the second solid exhaust valve 950, the second small hole exhaust valve 960, the conveying vessel shutoff valve 730, the over load timer C, the inlet shutoff delay timer D, the conveying vessel inlet valve 830, the balance timer B, the conveying vessel level meter 850, the gas nozzle electromagnetic valve 940, the pressure release overtime timer H, the pressure increase timer I, the over conveying timer J, the pressure sensor 860, the pressure low timer K, the air nozzle electromagnetic valve 970, the aeration timer A, the conveying vessel outlet valve 840 and the valve positioning timer G.

The dense phase pneumatic conveying apparatus according to the present invention can load and deliver ashes in the ash hopper 700 to corresponding stations by the ash conveying vessel 800 and the ash conveying pipe 900 continuously. The steps are described as follows:

First, closing the first solid exhaust valve 930 and the first small hole exhaust valve 920 between the ash conveying pipe 900. The air nozzle electromagnetic valve 970 of the ash conveying vessel 800 carries out pulse operation according to "aeration-on" and "aeration-off" time of the aeration timer A; when the pressure in the ash conveying vessel 800 is higher than or equal to the pressure in the baghouse dust collector case body 100 minus the offset pressure (OP) in the ash hopper 700, switching off the air nozzle electromagnetic valve 970 and opening the conveying vessel inlet valve 830 between the conveying vessel 800 and the ash hopper 700. When the conveying vessel inlet valve 830 is opened, the balance timer B starts counting time (5 seconds) and the conveying vessel 800 balances and offsets the pressure in the ash hopper 700 by the closed second small hole exhaust valve 960 according to a controlled rate. When the balance timer B is due, the conveying vessel inlet valve 830 and the second small hole exhaust valve 960 are opened. After the conveying vessel inlet valve 830 is opened, the conveying vessel shutoff valve 730 is opened and the over load timer C starts working (2 times of normal material discharging time). When the conveying vessel inlet valve 830 is opened, the ash hopper 700 uses "aeration-on" and "aeration-off" time of the aeration timer A to make the air nozzle electromagnetic valve 970 work. The materials fall into the ash conveying vessel 800 from the ash hopper 700 under gravity.

When the conveying vessel level meter 850 detects that the materials in the conveying vessel 800 reaches high level, the conveying vessel shutoff valve 730 is closed, and the inlet shutoff delay timer D (5 seconds) starts working. When the inlet shutoff delay timer D is due, the conveying vessel inlet valve 830 and the second solid exhaust valve 950 between the ash conveying vessel 800 and the ash hopper 700 are closed. When the conveying vessel inlet valve 830 and the second solid exhaust valve 950 between the ash conveying vessel 800 and the ash hopper 700 are closed, the first solid exhaust valve 930 between the ash conveying vessel 800 and the pressure-equalizing pipe 910 is opened, and the over pressure release timer E starts counting time (2 times of normal pressure releasing time). The ash conveying vessel 800 releases gas by closed ash conveying vessel 800 and the pressure-equalizing pipe 910 according to a controlled rate.

When the over pressure release timer E is due, the pressure in the ash conveying vessel 800 falls to OP; the first small hole exhaust valve 920 between the ash conveying vessel 800 and the pressure-equalizing pipe 910 is opened, and the pressure decrease timer F starts counting time (5 seconds). When the pressure decrease timer F is due, the pressure in the ash conveying vessel 800 is released and the load of the materials is completed.

The first solid exhaust valve 930 and the first small hole exhaust valve 920 between the ash conveying vessel 800 and the pressure-equalizing pipe 910 are closed. When the first solid exhaust valve 930 between the ash conveying vessel 800 and the pressure-equalizing pipe 910 are closed, the valve positioning timer G starts (2 seconds). The shutoff signals of the conveying vessel inlet valve 830, the second solid exhaust valve 950 between the ash conveying vessel 800 and the ash hopper 700, and the first solid exhaust valve 930 between the ash conveying vessel 800 and the pressure-equalizing pipe 910 must appear within the time of the valve positioning timer G.

When the valve positioning timer G is due and the conveying vessel outlet valve 840 is opened, the GCM gas nozzle electromagnetic valve 940 is activated, the pressure increase timer I starts counting time and the over conveying timer J starts counting time (2 times of normal time). If the pressure in the ash conveying vessel 800 is lower than or equal to the conveying pressure minus the offset pressure (OP) in the ash conveying vessel 800, the air nozzle electromagnetic valve 970 of the ash conveying vessel 800 carries out pulse operation according to "aeration-on" and "aeration-off" time of the aeration timer A.

When the ash conveying vessel 800 and the ash conveying pipe 900 are cleaned by air, the pressure in the ash conveying vessel 800 falls quickly. When the pressure falls below PS2, the GCM gas nozzle electromagnetic valve 940 is powered off, the pressure release overtime timer H starts working (2 times of normal pressure releasing time), and the pressure in the ash conveying vessel 800 is released by the ash conveying pipe 900. When the pressure in the ash conveying pipe 900 falls to OP, the pressure low timer K starts (5 seconds). When the pressure low timer K and the over pressure release timer E are due, an alarm for over pressure in the ash conveying vessel 800 will be generated (not emergent). The pressure in the ash conveying vessel 800 continues to be released. When the pressure low timer K is due, the first solid exhaust valve 930 and the first small hole exhaust valve 920 between the ash conveying vessel 800 and the pressure-equalizing pipe 910 are opened, and the conveying vessel outlet valve 840 is closed. The ash conveying vessel 800 completes the transportation circle.

Insulating layers 701, 801 and 901 are respectively arranged on the ash hopper 700, the ash conveying vessel 800 and the ash conveying pipe 900 to recycle the fine ashes (10-30 μm) from the baghouse dust collector effectively and hermetically.

What is claimed is:

1. A dust removal method using baghouse filter to process raw syngas from fluidized bed coal gasifier, wherein the raw syngas from the fluidized bed coal gasifier enters a baghouse from a gas inlet of a baghouse dust collector, flows through fibre spaces of the baghouse, and enters a clean gas pipe from a gas outlet of the baghouse dust collector; ashes are blocked and absorbed by outer surface of the baghouse and released fiom an ash outlet on the lower portion of the baghouse dust collector, wherein the baghouse dust collector comprises:
a baghouse dust collector case body having an outer wall, wherein the baghouse in the case body, the gas outlet on the upper potion of the case body and in communication with the baghouse, and a gas outlet valve arranged on the gas outlet; the gas inlet on the lower potion of the case body and in communication with the case body and the outer surface of the baghouse, a gas inlet valve arranged on the gas inlet;
a back flush inlet on the upper portion of the case body and in communication with the case body and the outer surface of the baghouse, a back flush gas source connected with the back flush inlet, a back flush valve arrmaged on the back flush inlet;
wherein the ash outlet is at the bottom of the baghouse dust collector and in communication with the case body and the outer surface of the baghouse; and an ash hopper in communication with the ash outlet;
wherein an insulating layer is arranged on the outer wall of the baghouse dust collector case body encompassing the baghouse to keep the temperature in the baghouse at 180° C.-250° C., and wherein the insulating layer is a steam-heated insulating layer comprising a steam tube wound around the outer wall of the case body and the steam tube is connected with a general steam valve.

2. The method according to claim 1, wherein pressure difference between the gas inlet of the baghouse and the gas outlet of the baghouse is controlled at 1000-5000 Pa.

3. The method according to claim 1, wherein the raw syngas from the fluidized bed coal gasifier enters the gas inlet under the pressure of 0.2-3.0 Mpa.

4. A system for processing raw syngas from a fluidized bed coal gasifier, wherein the system comprises:
a fluidized bed coal gasifier;
a baghouse dust collector case body;
a baghouse in the case body;
a gas outlet on the upper potion of the case body and in communication with the baghouse, a gas outlet valve arranged on the gas outlet;
a gas inlet on the lower potion of the case body and in communication with the case body and the outer surface of the baghouse, a gas inlet valve arranged on the gas inlet;
a back flush inlet on the upper portion of the case body and in communication with the case body and the outer surface of the baghouse, a back flush gas source connected with the back flush inlet,
a back flush valve arranged on the back flush inlet;
an ash outlet at the bottom of the baghouse dust collector and in communication with the case body and the outer surface of the baghouse; and
an ash hopper in communication with the ash outlet;
wherein: raw syngas from the fluidized bed coal gasifier is introduced into the gas inlet, and flows through fiber spaces of the baghouse,
wherein ashes are blocked and absorbed by outer surface of the baghouse and release from an ash outlet on the lower portion of the baghouse dust collector, and clean gas is released from the gas outlet;
wherein an insulating layer is arranged on the outer wall of the baghouse dust collector case body to keep the temperature in the baghouse at 180° C.-250° C., and
wherein the insulating layer is a steam-heated insulating layer comprising a steam tube wound around the outer wall of the case body and the steam tube is connected with a general steam valve.

5. The baghouse dust collector according to claim 4, wherein the insulating layer is an electricity-heated insulating layer.

6. The baghouse dust collector according to claim 4, wherein the steam-heated insulating layer comprises a steam tube wound around the outer wall of the baghouse dust collector case body, and the steam tube is connected with a general steam valve.

7. The baghouse dust collector according to claim 4, wherein the steam tube is spirally wound around the outer wall of the baghouse dust collector case body in circumference direction.

8. The baghouse dust collector according to claim 4, wherein the steam tube is arranged along the outer wall of the baghouse dust collector case body in axial direction.

9. The baghouse dust collector according to claim 4, wherein overheated steam at 200° C.-300° C. is introduced into the steam tube.

10. The baghouse dust collector according to claim 4, wherein the back flush valve is a controllable pulse valve.

11. The baghouse dust collector according to claim 4, wherein a temperature sensor is arranged in the baghouse dust collector case body, and the temperature sensor is in signal connection with a controller.

12. The baghouse dust collector according to claim 4, wherein the baghouse dust collector further comprises a dense phase pneumatic conveying apparatus connected with the ash hopper to deliver the collected ashes after dust removal by a dense phase pneumatic conveying method.

13. The baghouse dust collector according to claim 12, wherein the dense phase pneumatic conveying apparatus comprises an ash conveying vessel, an ash conveying pipe, pressure-equalizing pipes, a first small hole exhaust valve, a pressure decrease timer, a first solid exhaust valve, an over pressure release timer, a second solid exhaust valve, a second small hole exhaust valve, a conveying vessel shutoff valve, an over load timer, an inlet shutoff delay timer, a conveying vessel inlet valve, a balance timer, a conveying vessel level meter, a gas nozzle electromagnetic valve, a pressure release overtime timer, a pressure increase timer, an over conveying timer, a pressure sensor, a pressure low timer, an air nozzle electromagnetic valve, an aeration timer, a conveying vessel outlet valve and a valve positioning timer; the ash hopper has a first ash inlet on the top and a first ash outlet at the bottom, and the first ash inlet is in communication with the ash outlet valve at the bottom of the baghouse dust collector case body; the ash conveying vessel has a second ash inlet on the top and a second ash outlet at the bottom, the first ash outlet at the bottom of the ash hopper is in communication with the second ash inlet on the top of the ash conveying vessel via the conveying vessel shutoff valve and the conveying vessel inlet valve, the second ash outlet at the bottom of the ash conveying vessel is in communication with the ash conveying pipe via the conveying vessel outlet valve; the ash conveying pipe is in communication with the ash hopper and the ash conveying vessel via the pressure-equalizing pipes; the conveying vessel inlet valve is connected with the balance timer, the conveying vessel shutoff valve is connected with the over load timer and the inlet shutoff delay timer, the conveying vessel outlet valve is connected with the valve positioning timer; the first small hole exhaust valve and the first solid exhaust valve are arranged on the pressure—equalizing pipe between the ash conveying pipe and the ash conveying vessel, the first solid exhaust valve is connected with the over pressure release timer, and the first small hole exhaust valve is connected with the pressure decrease timer; the second solid exhaust valve and the second small hole exhaust valve are arranged on the pressure-equalizing pipe between the ash conveying vessel and the ash hopper; the gas nozzle electromagnetic valve is arranged on the upper portion of the ash conveying vessel, and the air nozzle electromagnetic valve is arranged on the lower potion of the ash conveying vessel, the gas nozzle electromagnetic valve is connected with the pressure release overtime timer, the pressure increase timer and the over conveying timer; the conveying vessel level meter and the pressure sensor are arranged in the ash conveying vessel, the conveying vessel level meter is connected with the balance timer, and the pressure sensor is connected with the pressure low timer; a controller is connected with the first small hole exhaust valve, the pressure decrease timer, the first solid exhaust valve, the over pressure release timer, the second solid exhaust valve, the second small hole exhaust valve, the conveying vessel shutoff valve, the over load timer, the inlet shutoff delay timer, the conveying vessel inlet valve, the balance timer, the conveying vessel level meter, the gas nozzle electromagnetic valve, the pressure release overtime timer, the pressure increase timer, the over conveying timer, the pressure sensor, the pressure low timer, the air nozzle electromagnetic valve, the aeration timer, the conveying vessel outlet valve and the valve positioning timer.

14. The baghouse dust collector according to claim 13, wherein insulating layers are respectively arranged on the ash hopper, the ash conveying vessel and the ash conveying pipe.

* * * * *